(12) United States Patent
Wisniewski et al.

(10) Patent No.: US 12,278,541 B2
(45) Date of Patent: Apr. 15, 2025

(54) METHOD AND APPARATUS FOR ACTIVE COOLING OF INTAKE AIR FOR A HYBRID COOLED BELT STARTER GENERATOR

(71) Applicant: Vitesco Technologies USA, LLC, Auburn Hills, MI (US)

(72) Inventors: Andrew Joseph Wisniewski, South Lyon, MI (US); Laura Noel Church, Mancelona, MI (US)

(73) Assignee: Vitesco Technologies USA, LLC, Auburn Hills, MI (US)

( * ) Notice: Subject to any disclaimer, the term of this patent is extended or adjusted under 35 U.S.C. 154(b) by 488 days.

(21) Appl. No.: 17/656,654

(22) Filed: Mar. 28, 2022

(65) Prior Publication Data

US 2023/0307982 A1 Sep. 28, 2023

(51) Int. Cl.
*H02K 5/20* (2006.01)
*H02K 5/15* (2006.01)
*H02K 5/18* (2006.01)
*H02K 9/06* (2006.01)
*H02K 9/22* (2006.01)

(52) U.S. Cl.
CPC ............... *H02K 5/207* (2021.01); *H02K 5/15* (2013.01); *H02K 9/06* (2013.01); *H02K 9/227* (2021.01)

(58) Field of Classification Search
CPC .......... H02K 5/207; H02K 5/203; H02K 5/20; H02K 5/18; H02K 5/04; H02K 5/15; H02K 9/00; H02K 9/06; H02K 9/04; H02K 9/02; H02K 9/227; H02K 9/22
See application file for complete search history.

(56) References Cited

U.S. PATENT DOCUMENTS

| 6,218,747 B1 * | 4/2001 | Tsuruhara | H02K 11/05 310/52 |
| 8,443,868 B2 | 5/2013 | Barnwell | |
| 9,225,224 B2 | 12/2015 | Memminger | |
| (Continued) | | | |

FOREIGN PATENT DOCUMENTS

| DE | 102005032968 A1 * | 2/2007 | ............. H02K 11/33 |
| DE | 102011087602 A1 * | 6/2013 | ............. H02K 11/33 |
| (Continued) | | | |

OTHER PUBLICATIONS

Wilkon Limited, Electric Motor Cooling Systems,www.welkon.net.
(Continued)

*Primary Examiner* — Edgardo San Martin

(57) ABSTRACT

A cooling system for a belt starter generator, which has at least one housing portion, a plurality of flow apertures integrally formed as part of the housing portion, a heat sink connected to the housing portion, the heat sink cooled by liquid cooling, and a plurality of fins integrally formed as part of the heat sink. A rotor having a shaft is at least partially disposed in the housing portion, and a plurality of slots are integrally formed as part of the rotor. An impeller having a plurality of blades is mounted on the shaft. As the shaft rotates, the rotor and the impeller also rotate, and the blades generate air flow to create a flow path such that air flows between each of the fins, through the flow apertures, and through the slots of the rotor, and through the blades, achieving air cooling of the belt starter generator.

15 Claims, 14 Drawing Sheets

(56) References Cited

U.S. PATENT DOCUMENTS

| | | | | |
|---|---|---|---|---|
| 9,793,781 | B2 * | 10/2017 | Patrick | H02K 9/227 |
| 9,912,210 | B2 | 3/2018 | Gagnon | |
| 10,320,262 | B2 * | 6/2019 | Griffen | H02K 11/0094 |
| 2004/0150270 | A1 * | 8/2004 | Nagayama | H02K 5/207 |
| | | | | 310/59 |
| 2011/0101803 | A1 * | 5/2011 | Hayashi | H02K 9/06 |
| | | | | 310/62 |

FOREIGN PATENT DOCUMENTS

| | | | | |
|---|---|---|---|---|
| DE | 102012212166 A1 * | 1/2014 | | H02K 11/046 |
| DE | 102014225588 A1 * | 6/2015 | | H02K 11/33 |
| DE | 102015111856 A1 | 2/2016 | | |
| DE | 102015224322 A1 * | 12/2016 | | H02K 11/33 |
| DE | 102015219669 A1 * | 4/2017 | | |
| DE | 102015221130 A1 * | 5/2017 | | |
| KR | 20210036066 A * | 4/2021 | | |

OTHER PUBLICATIONS

Kim, et al; Evaluation of the Effect of Operating Parameter on Thermal Performance of an Integrated Starter Generator in Hybrid Electric Vehicles, Energies; www.wdpi.com/journal/energies, 8990-9008, 2015.

* cited by examiner

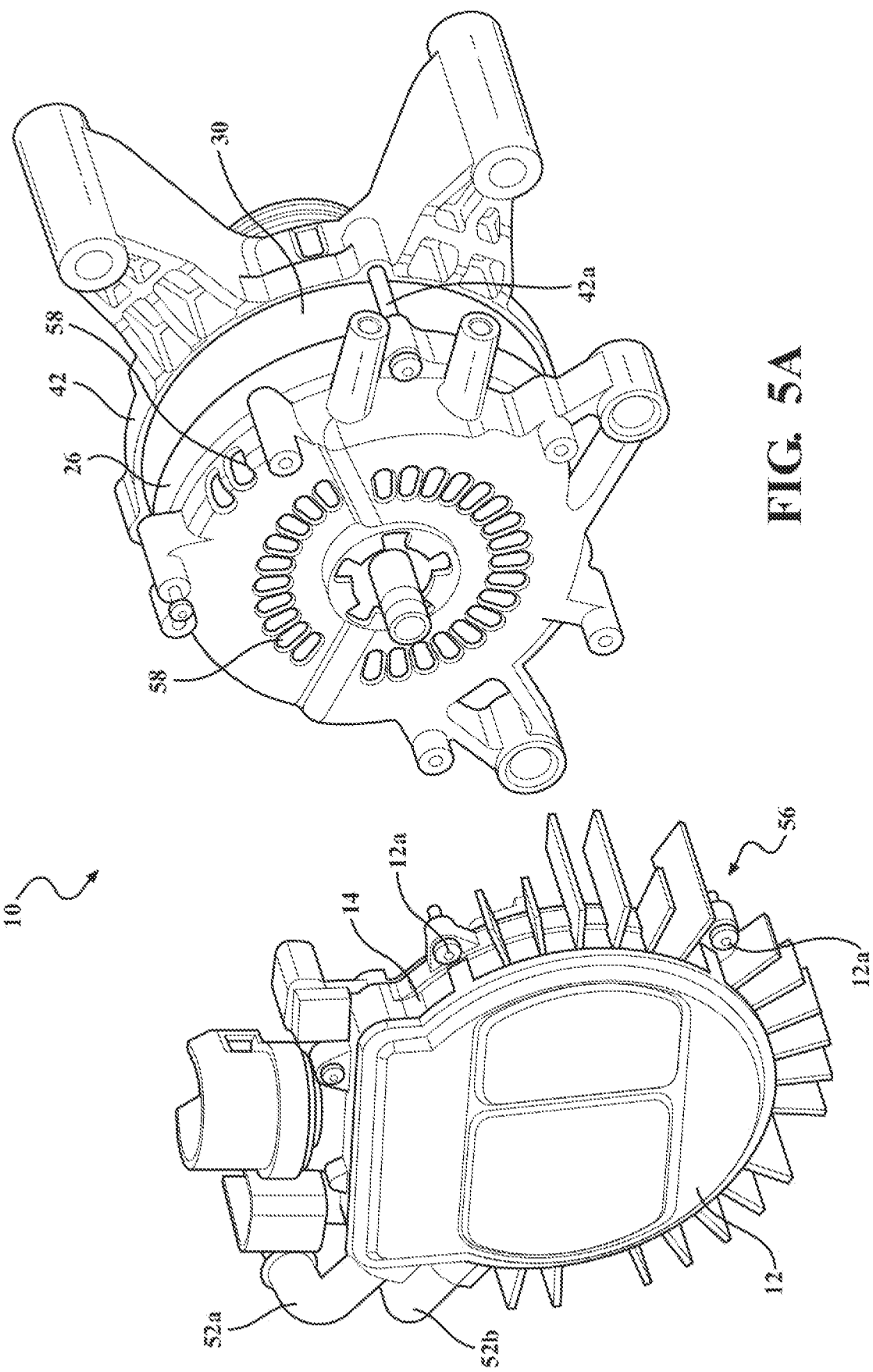

METHOD AND APPARATUS FOR ACTIVE COOLING OF INTAKE AIR FOR A HYBRID COOLED BELT STARTER GENERATOR

FIELD OF THE INVENTION

The invention relates generally to a cooling system for an electric machine, such as a belt starter generator.

BACKGROUND OF THE INVENTION

Ambient air in an engine compartment of a vehicle at times may easily exceed the limits of the preferred operating conditions for various components located in the engine compartment. One of the components in an engine compartment is an electric machine, such as a belt starter generator (BSG).

Current designs provide for direct cooling of an electric machine in a closed system or forced air configuration. However, these designs do not address ways to reduce the inlet air temperature associated with electric machines which are air cooled. The ambient air is used to cool the electric machine, and if the ambient air exceeds the limit of the preferred operating conditions of the machine, air cooling may not reduce the operating temperature of the electric machine, and the electric machine may not operate as desired.

Accordingly, there exists a need for an improved heat management of a hybrid cooled electric machine, such as a belt starter generator, to improve overall system performance along with increasing the operational life.

SUMMARY OF THE INVENTION

In an embodiment, the present invention is a cooling system for an electric machine, which in one embodiment, the electric machine is a belt starter generator (BSG). The BSG includes several components, such as a rotor, a stator, and an inverter.

Also included is a cooling device, which is part of the inverter. The cooling device is liquid cooled, and functions to remove thermal energy from the electronics of the inverter. In an embodiment, the surface area of the cooling device is extended, such that thermal energy or heat is removed from the air immediately surrounding the air intake of the BSG. This cooled air is then pulled into the BSG during operation, improving the removal of thermal energy from the entire system. In an embodiment, the surface area of the cooling device is extended by incorporating the use of fins as part of the cooling device, which in an embodiment are integrally formed as part of the cooling device.

In an embodiment, no additional or secondary components are added to the cooling system, but rather the surface area of an existing component, such as the cooling device, is expanded to improve overall cooling efficiency.

In an embodiment, the present invention is used as part of the BSG, but it is within the scope of the invention that the present invention may be suitable with any electric motor, and for any type of vehicle.

In an embodiment, the present invention is a cooling system for a belt starter generator, which has at least one housing portion, a plurality of flow apertures integrally formed as part of the housing portion, a heat sink connected to the housing portion, the heat sink cooled by liquid cooling, and a plurality of fins integrally formed as part of the heat sink. A rotor is at least partially disposed in the housing portion, the rotor has a shaft, and a plurality of slots are integrally formed as part of the rotor. An impeller is mounted on the shaft, and the impeller has a plurality of blades. As the shaft rotates, the rotor and the impeller also rotate, and the plurality of blades generate air flow to create a flow path such that air flows between each of the fins, through the flow apertures, and through the slots integrally formed as part of the rotor, and through the blades, achieving air cooling of the belt starter generator.

In an embodiment, the housing portion is an end shield, and the flow apertures are integrally formed as part of the end shield.

In an embodiment, a stator is at least partially disposed in the housing portion such that the stator surrounds the rotor. There is a gap between the stator and the plurality of blades, and the flow path includes the air flowing through the gap after the flow flows through the plurality of blades.

In an embodiment, the stator is partially disposed in a motor housing, and a plurality of flow apertures integrally formed as part of the motor housing. The flow path includes the flow of the air through the plurality of flow apertures integrally formed as part of the motor housing after flowing through the air gap.

In an embodiment, the heat sink includes a flow cavity, an inlet port in fluid communication with the flow cavity, and an outlet port in fluid communication with the flow cavity. The liquid cooling to the heat sink is provided by fluid flowing from the inlet port, circulating through the flow cavity, and flowing through the outlet port, reducing the temperature of the heat sink.

In an embodiment, a clamp mounted to the shaft and adjacent to the rotor, and a plurality of flow apertures are integrally formed as part of the clamp. The clamp is positioned such that each of the plurality of flow apertures integrally formed as part of the clamp is aligned with a corresponding one of the plurality of slots.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5A is a first partial exploded view of a BSG which has a cooling system, according to embodiments of the present invention;

DETAILED DESCRIPTION OF THE PREFERRED EMBODIMENTS

Figure 1:
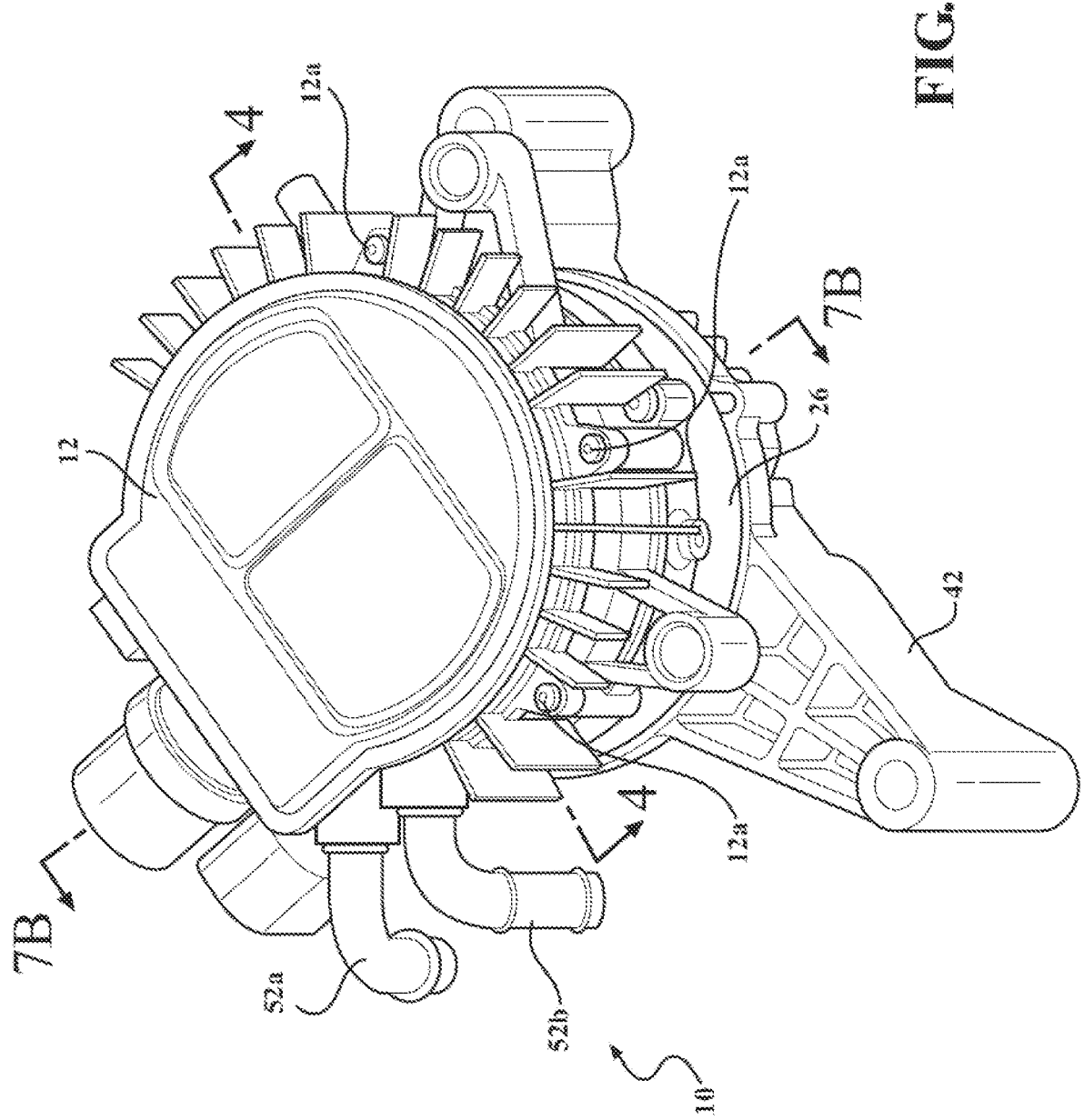
FIG. 1 is a first perspective view of a BSG which has a cooling system, according to embodiments of the present invention.
Figure 2A:
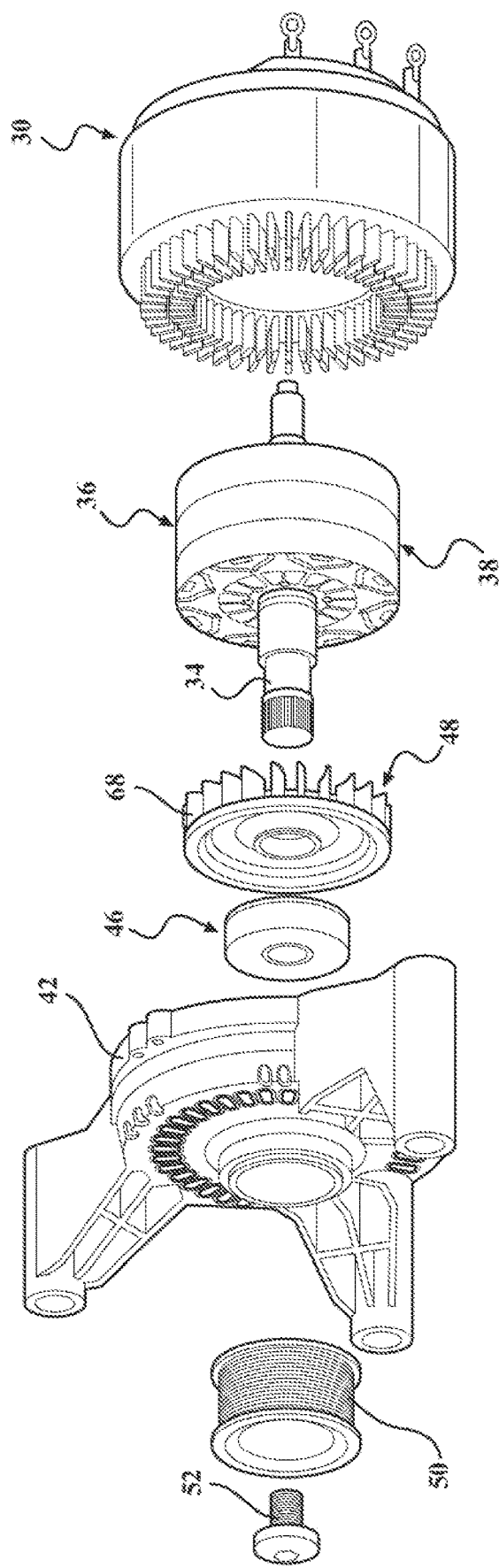
FIG. 2A is an exploded view of several components which are part of a BSG which has a cooling system, according to embodiments of the present invention.
Figure 2B:
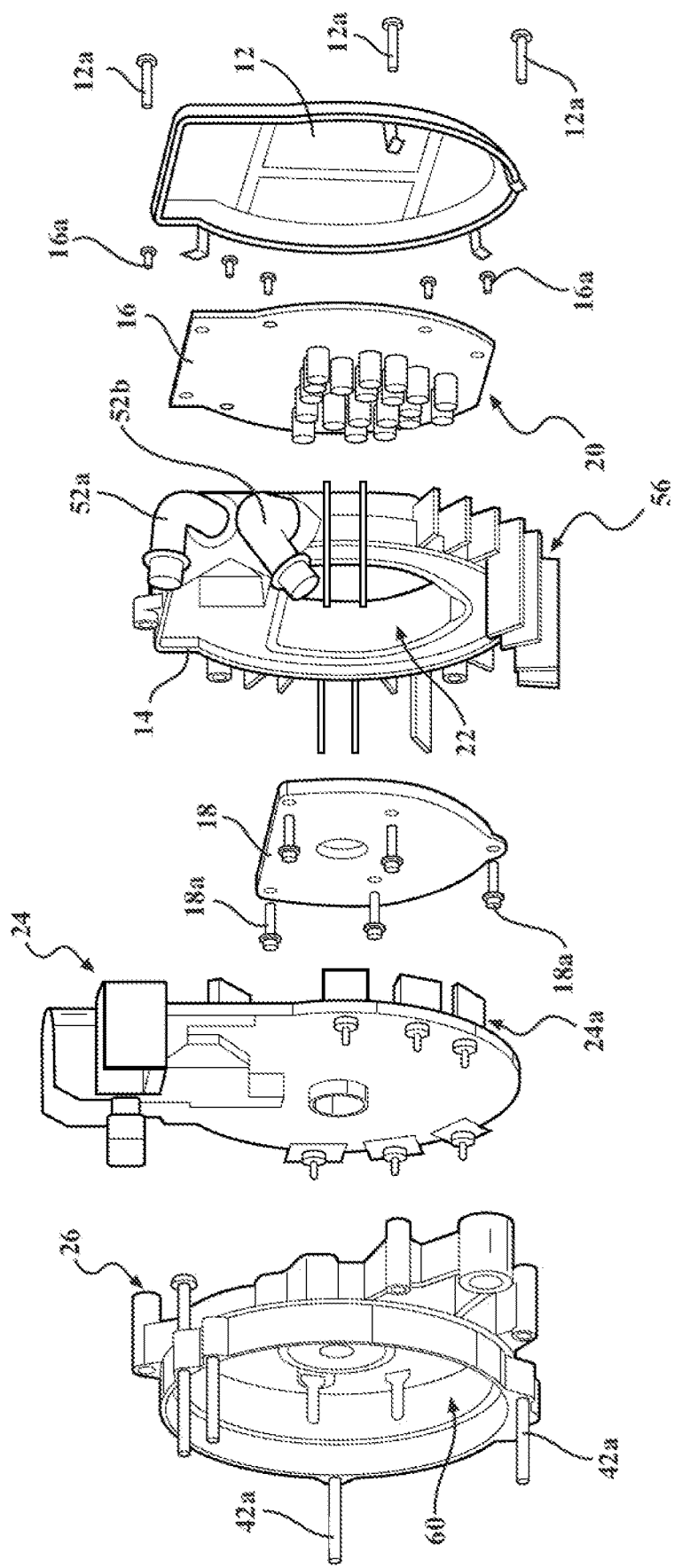
FIG. 2B is an exploded view of several other components which are part of a BSG which has a cooling system, according to embodiments of the present invention.
Figure 3:
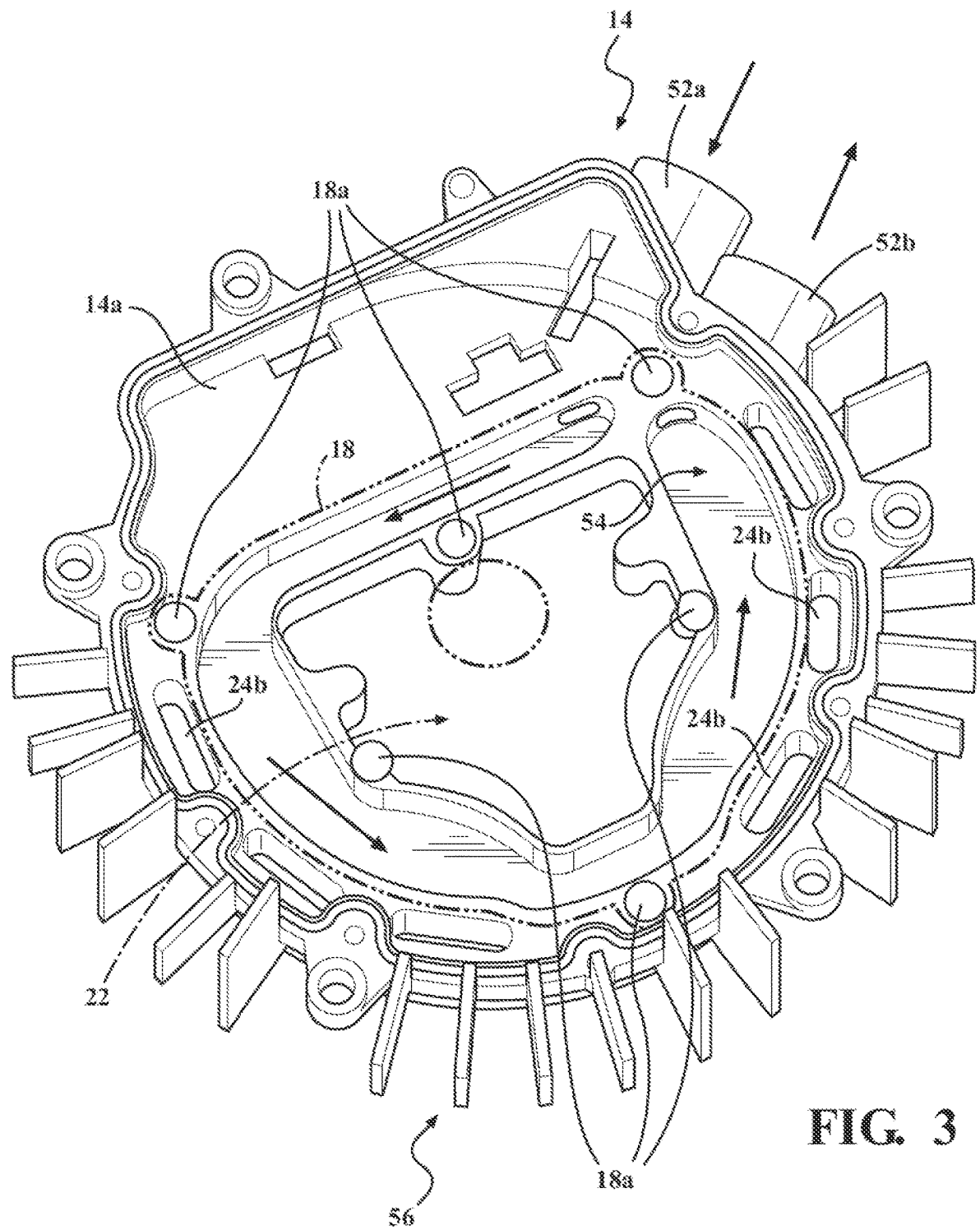
FIG. 3 is a perspective view of a cooling device used as part of a BSG having a cooling system, according to embodiments of the present invention.
Figure 4:
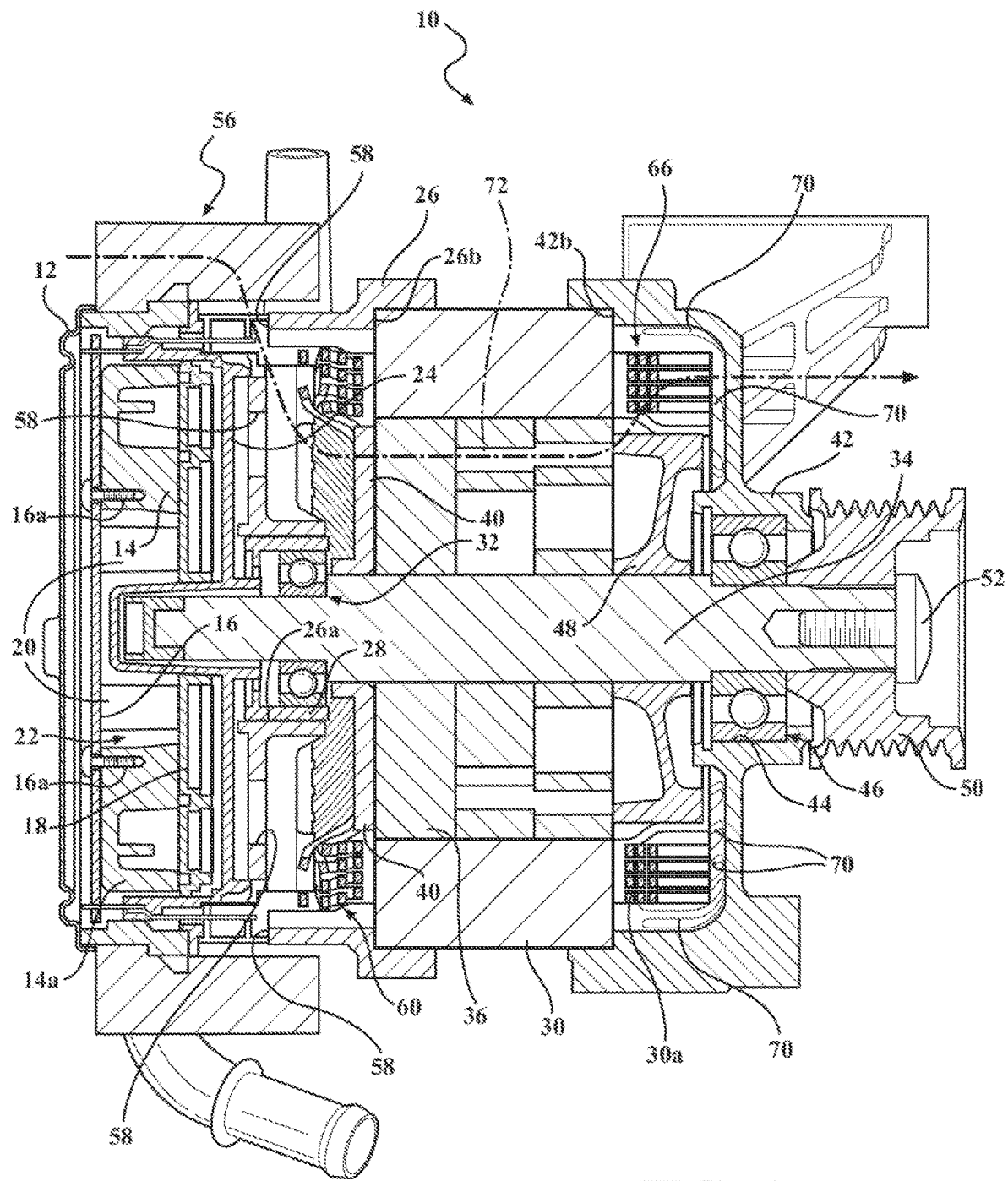
FIG. 4 is a sectional view taken along lines 4-4 of FIG. 1.

The following description of the preferred embodiment(s) is merely exemplary in nature and is in no way intended to limit the invention, its application, or uses.

A hybrid cooled belt starter generator (BSG) having an embodiment of cooling system according to the present invention is shown in the Figures generally at 10. Referring generally to FIGS. 1-4, the BSG 10 includes a cover 12, which in this embodiment is made of steel, but it is within the scope of the invention that other materials may be used. The cover 12 is connected to a cooling device 14, which in this embodiment is a heat sink. Disposed between the cover 12 and the heat sink 14 is a printed circuit board (PCB) 16, and the PCB 16 is connected to the heat sink 14 using several fasteners 16a. The fasteners 16a are inserted through apertures of the PCB 16 and into corresponding threaded apertures formed as part of the heat sink 14. There are also fasteners 12a which are inserted through apertures of the cover 12 into corresponding threaded apertures formed as part of the heat sink 14, connecting the cover 12 to the heat sink 14. A cooler cover 18 is also connected to the heat sink 14, and protects the various electrical components, shown generally at 20, which are mounted to the PCB 16. There are fasteners 18a which are inserted through apertures formed as part of the cooler cover 18 and into corresponding threaded apertures formed as part of the heat sink 14, connecting the cooler cover 18 to the heat sink 14. The electrical components 20 are part of a power inverter used to convert AC current to DC current, and to convert DC current to AC current. When the PCB 16 is assembled to the cover 12 and the heat sink 14, the electrical components 20 are located in a cavity, shown generally at 22, of the heat sink 14. The cooler cover 18 is attached to the heat sink 14 such that the electrical components 20 are located between the PCB 16 and the cooler cover 18 in the cavity 22.

The BSG 10 also includes a mainframe, shown generally at 24, connected to the heat sink 14 and a housing portion, which in the embodiment shown is an end shield, shown generally at 26. The mainframe 24 also includes electrical components, shown generally at 24a, where some of the electrical components 24a extend through apertures 24b formed as part of the heat sink 14 and contact the PCB 16 when the BSG 10 is assembled, placing the mainframe 24 in electrical communication with the PCB 16. The mainframe 24 also includes a connector 24c (shown in FIG. 7B), which in this embodiment is a 48 v post, but it is within the scope of the invention that other types of connectors may be used. The end shield 26 partially supports a stator, shown generally at 30, having stator windings 30a, where the stator 30 is partially received into the end shield 26 on the opposite side of the end shield 26 as the mainframe 24. The end shield 26 includes an aperture 26a, and disposed in the aperture 26a is a bearing housing 28, and located in and supported by the bearing housing 28 is a first bearing 32. The first bearing 32 is mounted on a shaft 34, which is part of a rotor, shown generally at 36. Mounted to the shaft 34 are several laminations, shown generally at 38, which are adjacent with and in contact with one another, and are also part of the rotor 36. Also mounted to the shaft 34 is a clamp 40, which applies force to and maintains the position of the laminations 38 on the shaft 34.

The stator 30 is also partially disposed in another housing portion, which in the embodiment shown is a motor housing, shown generally at 42, and the motor housing 42 has an aperture 44, and disposed in the aperture 44 is a second bearing 46. The second bearing 46 is mounted to the shaft 34, and the bearings 32,46 allow for the rotor 36 to rotate relative to the stator 30, the end shield 26, and the motor housing 42. Located in the motor housing 42 and mounted to the shaft 34 is an impeller 48. The impeller 48 is mounted to the shaft 34 such that the impeller 48 is adjacent the laminations 38, and the impeller 48 rotates together with the rotor 36.

The motor housing 42 is connected to the end shield 26 using elongated fasteners 42a. The elongated fasteners 42a are inserted through apertures formed as part of the end shield 26 and into threaded apertures formed as part of the motor housing 42 to secure the rotor 36, the stator 30, and the impeller 48 in the proper location between the end shield 26 and the motor housing 42. The stator 30 is in contact with and located between a ledge 26b formed as part of the end shield 26 and a ledge 42b formed as part of the motor housing 42.

The shaft 34 extends through the aperture 44 of the motor housing 42, and a pulley 50 is connected to the end of the shaft 34. In the embodiment shown, the pulley 50 is connected to the shaft 34 using a fastener 52, but it is within the scope of the invention that the pulley 50 may be connected to the shaft 34 in any suitable manner.

The heat sink 14 includes an inlet port 52a and an outlet port 52b, and both of the ports 52a,52b are in fluid communication with a flow cavity, shown generally at 54, where the flow cavity 54 is integrally formed as part of a housing 14a of the heat sink 14. During operation, fluid circulates through the flow cavity 54 to provide cooling to the heat sink 14. The heat sink 14 also includes a plurality of cooling features, which in this embodiment is a plurality of fins, shown generally at 56, where the fins 56 partially circumscribe the housing 14a of the heat sink 14.

Figure 5B:
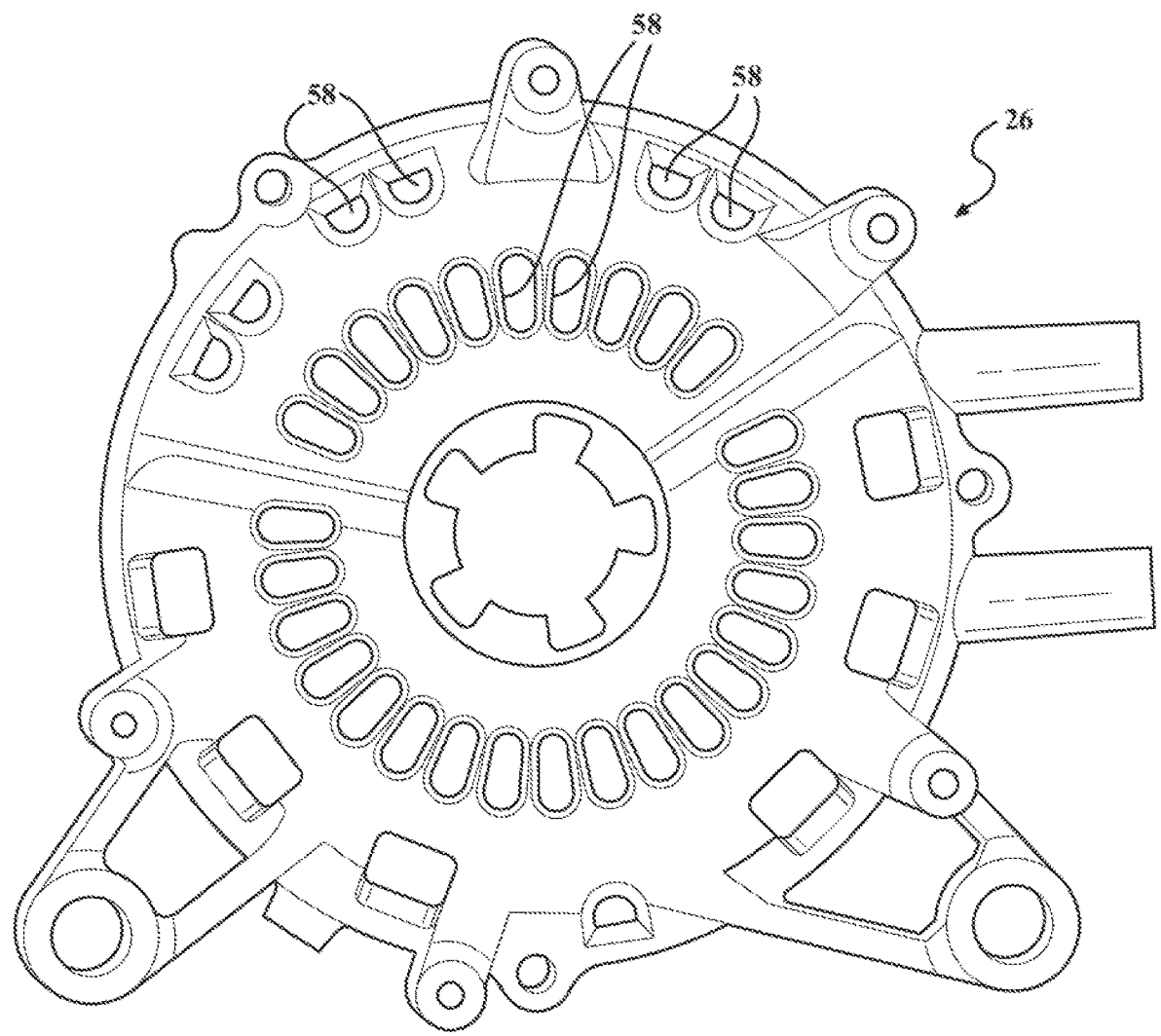
FIG. 5B is a front view of an end shield used as part of a BSG which has a cooling system, according to embodiments of the present invention.
Figure 6A:
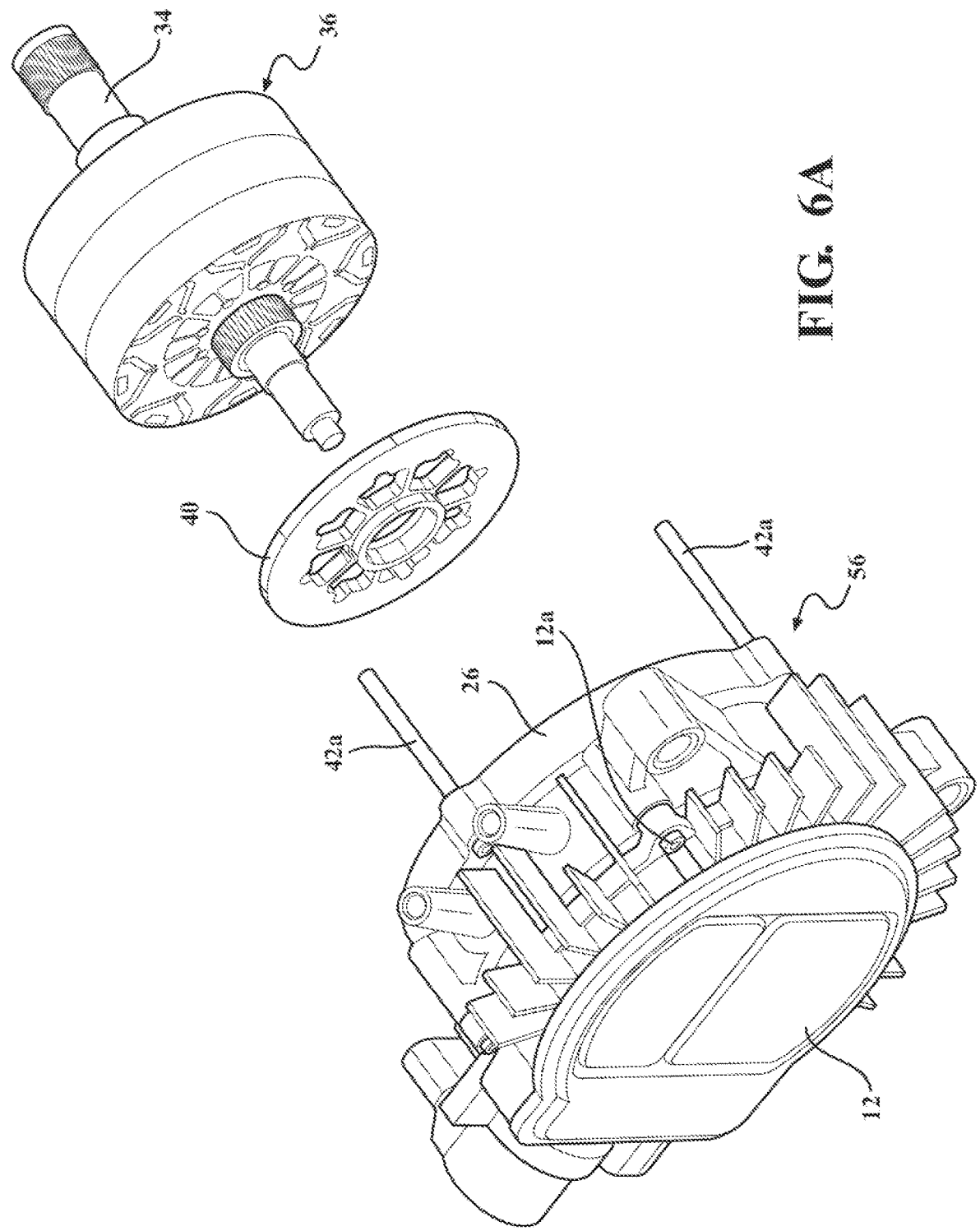
FIG. 6A is a second partial exploded view of a BSG which has a cooling system, according to embodiments of the present invention.
Figure 6B:
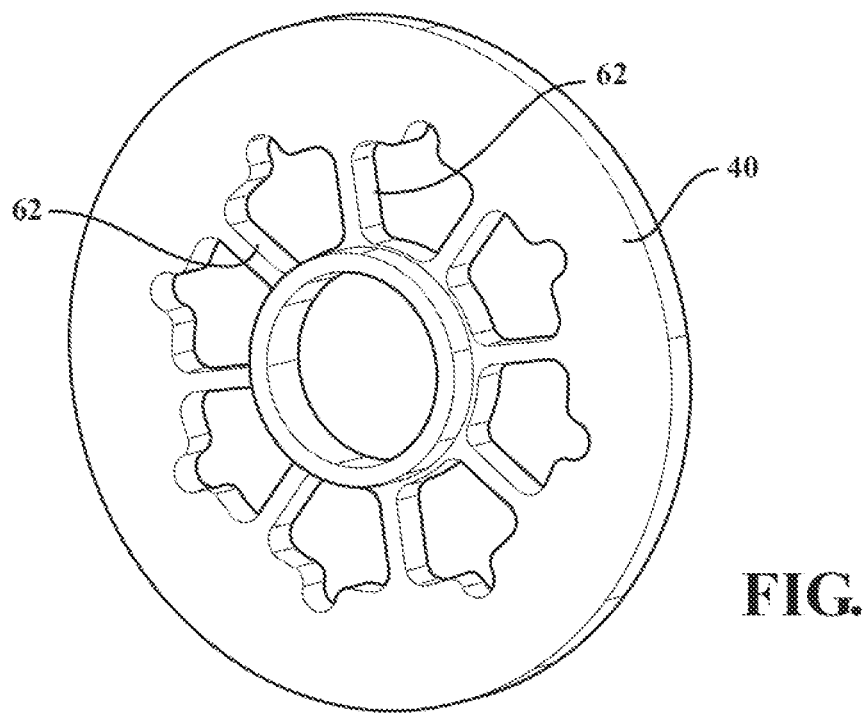
FIG. 6B is a perspective view of a clamp used as part of a BSG which has a cooling system, according to embodiments of the present invention.
Figure 6C:
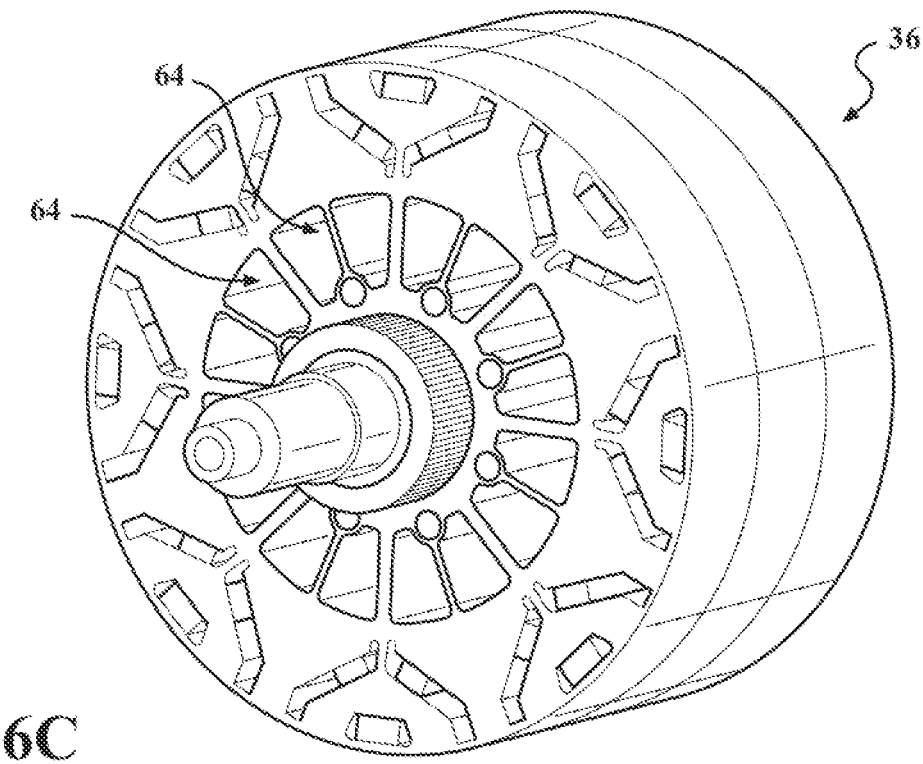
FIG. 6C is a perspective view of a rotor used as part of a BSG which has a cooling system, according to embodiments of the present invention.
Figure 7A:
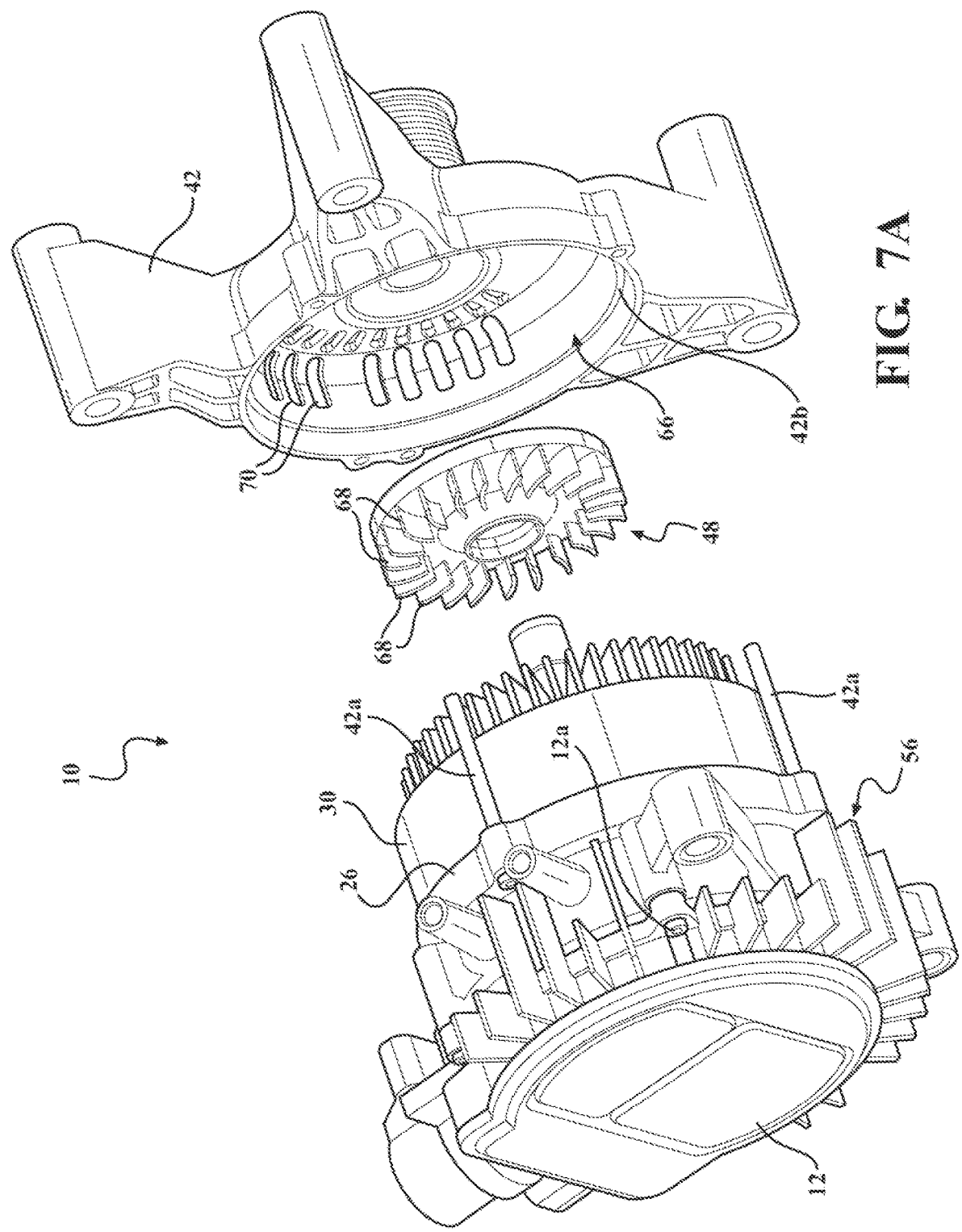
FIG. 7A is a third partial exploded view of a BSG which has a cooling system, according to embodiments of the present invention.
Figure 7B:
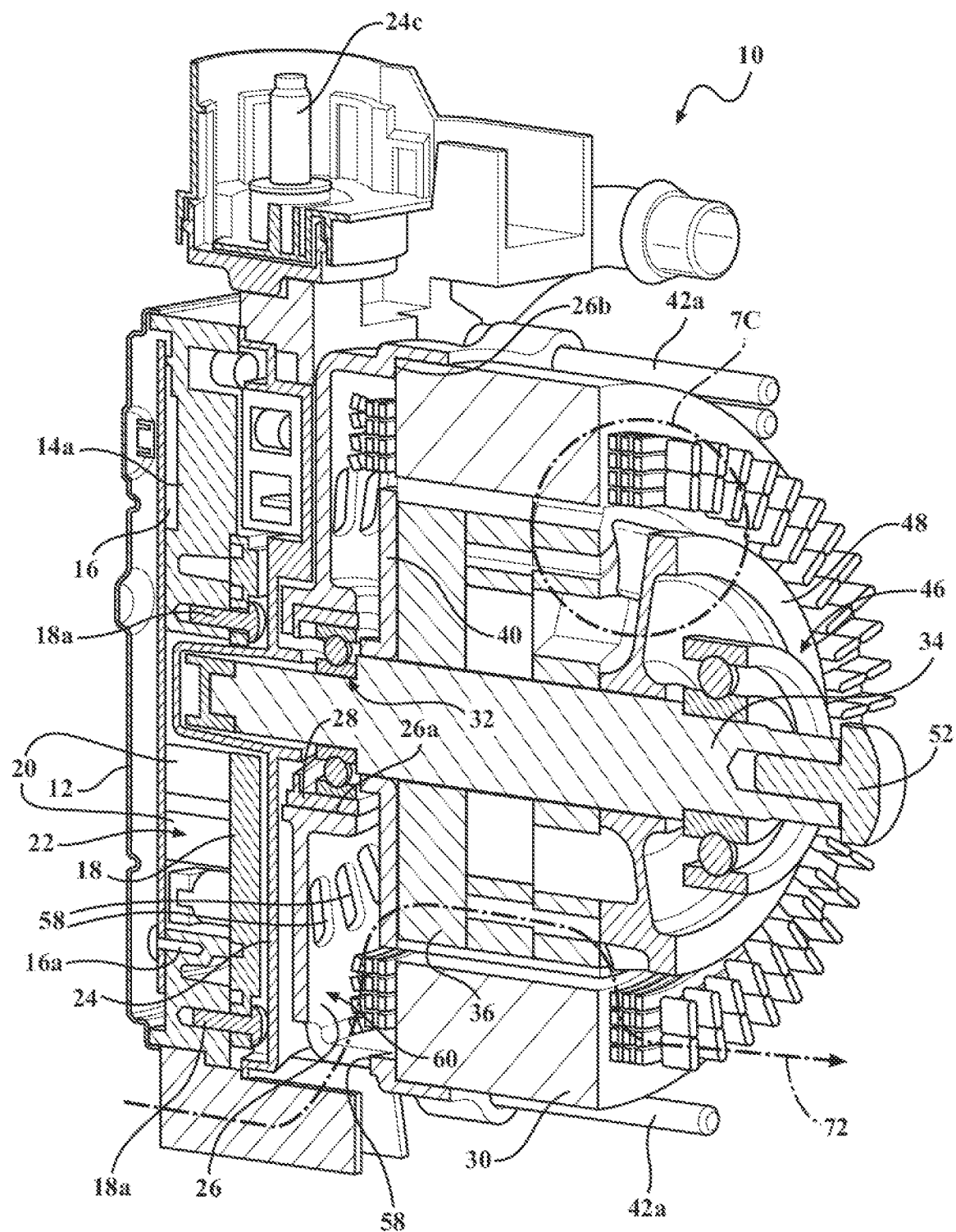
FIG. 7B is a sectional view taken along lines 7B-7B of FIG. 1.
Figure 7C:
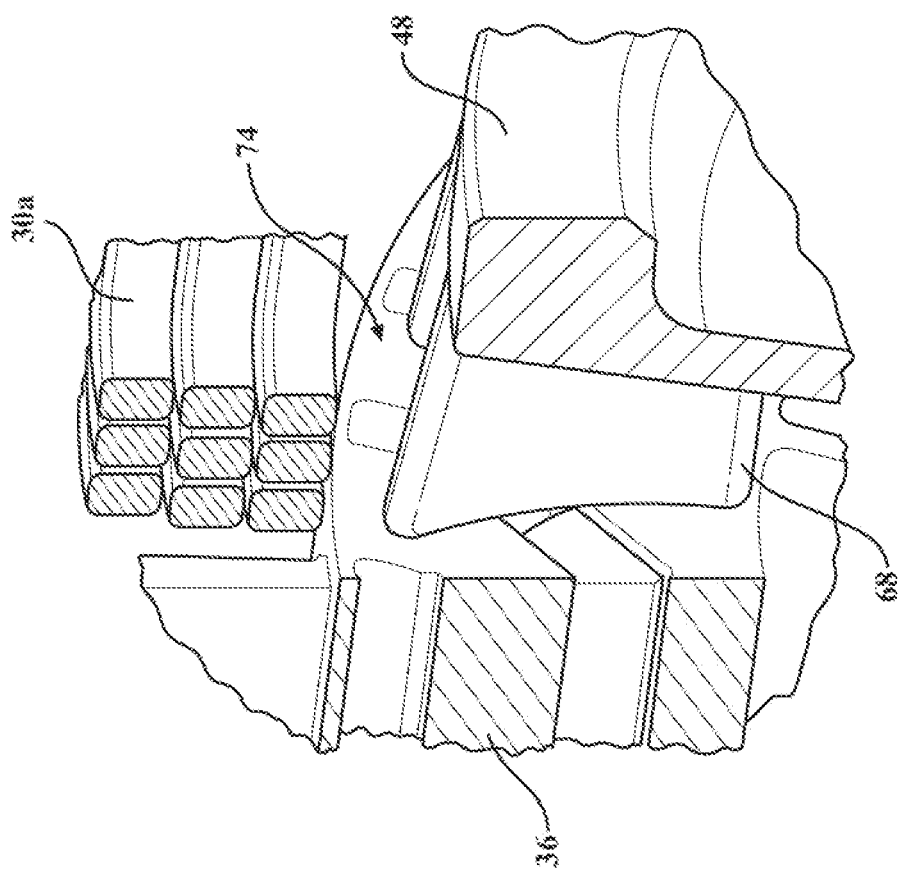
FIG. 7C is an enlarged view of the circled portion shown in FIG. 7B.
Figure 8A:
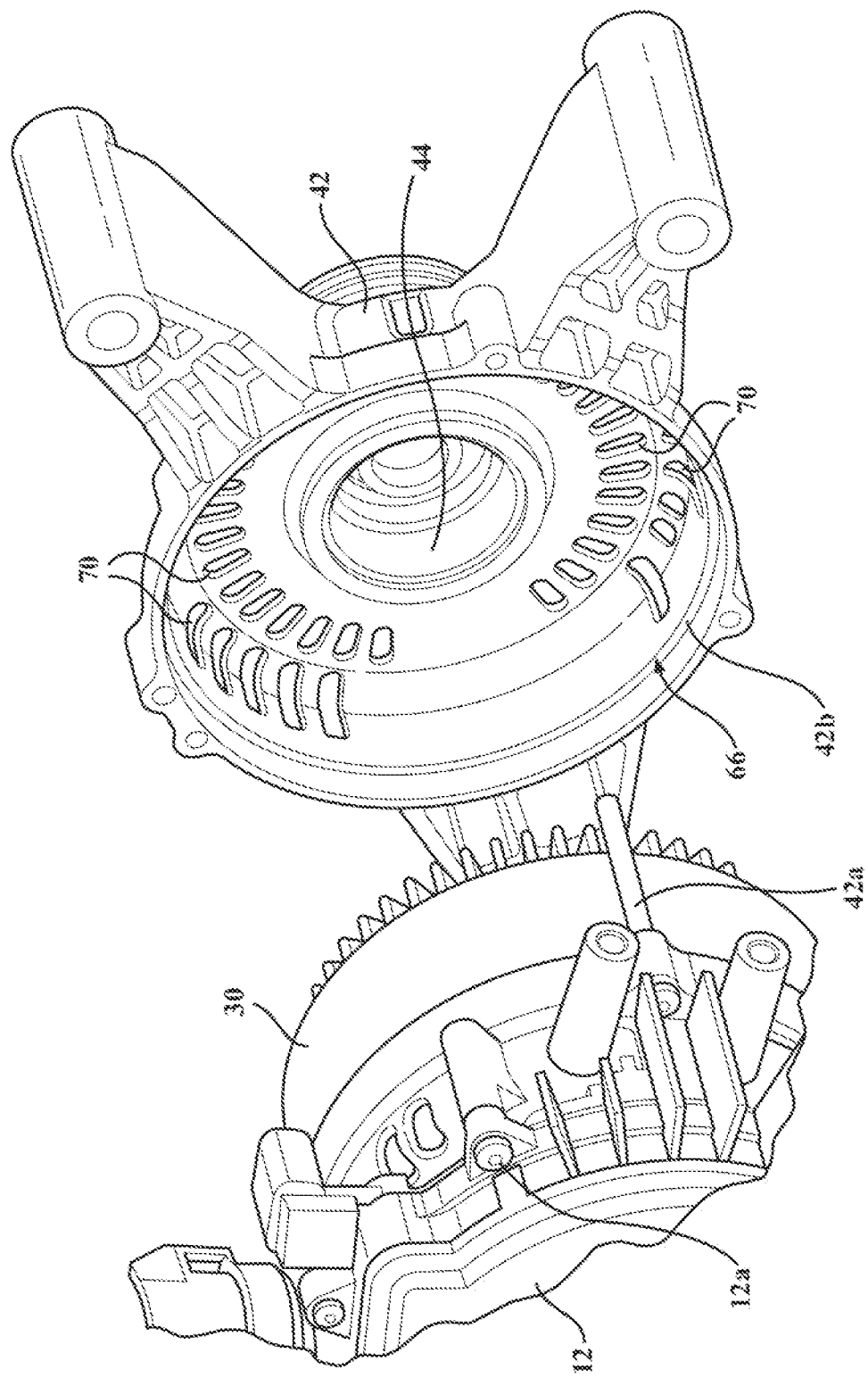
FIG. 8A fourth partial exploded view of a BSG which has a cooling system, according to embodiments of the present invention.
Figure 8B:
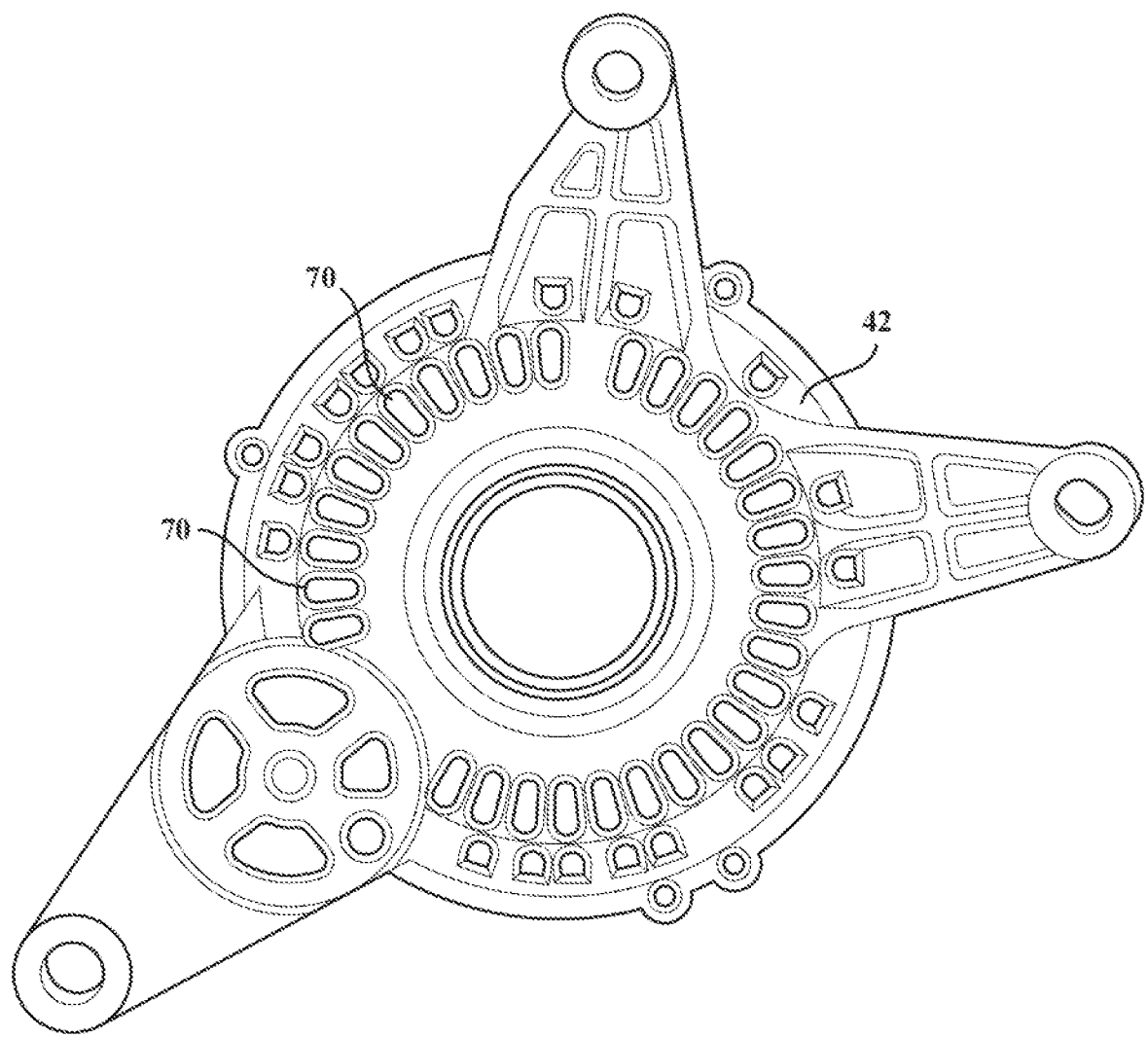
FIG. 8B front view of a motor housing used as part of a BSG which has a cooling system, according to embodiments of the present invention.

Referring to FIGS. 5A-5B, and 7B, integrally formed as part of the end shield 26 is a first plurality of flow apertures 58 which are in fluid communication with a cavity, shown generally at 60, of the end shield 26. As shown in FIGS. 6A-6B, a second plurality of flow apertures 62 is formed as part of the clamp 40, and the second plurality of flow apertures 62 are also in fluid communication with the cavity 60. Each of the laminations 38 also include apertures, such that when the laminations 38 are assembled together as shown in the Figures, a plurality of slots, shown generally at 64 in FIG. 6C, is formed as part of the rotor 36.

Referring to FIGS. 7A-8B, the impeller 48 is located in a cavity, shown generally at 66, of the motor housing 42, and integrally formed as part of the impeller 48 is a plurality of blades 68. When the impeller 48 rotates, the blades 68 generate air flow. A third plurality of flow apertures 70 is integrally formed as part of the motor housing 42, and the third plurality of flow apertures 70 is in fluid communication with the cavity 66.

Referring to the Figures generally, during operation, the BSG 10 includes both primary cooling and secondary cooling using the heat sink 14. In the embodiment shown, the primary cooling is liquid cooling, and the secondary cooling is air cooling. Fluid flows from the inlet port 52a into the flow cavity 54, circulates through the flow cavity 54, and flows from the flow cavity 54 and through the outlet port 52b, which provides the liquid cooling to the heat sink 14. In an embodiment, the liquid circulated through the heat sink 14 is an active refrigerant, but it is within the scope of the invention that other types of liquids could be used. This removal of thermal energy from the heat sink 14 reduces the temperature of the heat sink 14, therefore the temperature of the fins 56 is reduced as well. Therefore, if the ambient temperature of the air around the BSG 10 is higher than the temperature of the heat sink 14, the temperature of the air flowing in between the fins 56 is reduced, prior to entering the end shield 26.

The pulley 50 is connected to a belt (not shown) which rotates the pulley 50, and therefore the shaft 34, the rotor 36, the clamp 40, and the the impeller 48 are rotated as well. As the impeller 48 is rotated, the blades 68 generate a flow of air, creating a flow path 72 of the air through the BSG 10. The flow path 72 includes air flowing between the fins 56, and through the first plurality of flow apertures 58 of the end shield 26 and into the cavity 60. The flow path 72 then includes the air flowing through the second plurality of flow apertures 62 formed as part of the clamp 40, and through the slots 64 formed as part of the rotor 36. The flow path 72 also includes the air flowing through the blades 68 and into a gap 74 between the impeller 48 and the stator windings 30a. The next part of the flow path 72 includes the air flowing from the gap 74 through the third plurality of flow apertures 70 of the motor housing 42, and out of the motor housing 42.

The flow path 72 of the air removes thermal energy from the BSG 10, reducing the operating temperature of the BSG 10, improving operational life.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
a cooling system for a belt starter generator, comprising:
at least one housing portion;
a heat sink connected to the housing portion, the heat sink is cooled by primary cooling, the heat sink further comprising:
a flow cavity, the primary cooling to the heat sink is provided by fluid flowing circulating through the flow cavity;
at least one cooling feature being part of the heat sink, the cooling feature cooled by secondary cooling;
a rotor at least partially disposed in the housing portion;
a PCB being part of the belt starter generator, the PCB connected to the heat sink;
a mainframe connected to the at least one housing portion and the heat sink, such that the heat sink is disposed between the PCB and the mainframe; and
at least one air flow path;
wherein air flows along the at least one air flow path such that the air is cooled by the at least one cooling feature, and then flows into the at least one housing portion to cool the rotor to provide the secondary cooling to the rotor.

2. The apparatus of claim 1, further comprising:
a plurality of slots integrally formed as part of the rotor;
wherein the flow path further comprises the air flowing through the plurality of slots after flowing into the at least one housing portion, to provide the secondary cooling to the rotor.

3. The apparatus of claim 2, further comprising:
a clamp adjacent to the rotor; and
a plurality of flow apertures integrally formed as part of the clamp;
wherein the clamp is positioned such that each of the plurality of flow apertures integrally formed as part of the clamp is aligned with a corresponding one of the plurality of slots.

4. The apparatus of claim 1, the at least one housing portion further comprising:
an end shield; and
at least one flow aperture integrally formed as part of the end shield;
wherein the at least one air flow path further comprises the air flowing through the at least one flow aperture integrally formed as part of the end shield after being cooled by the at least one cooling feature and prior to cooling the rotor.

5. The apparatus of claim 1, further comprising:
a shaft being part of the rotor; and
an impeller having a plurality of blades, the impeller mounted to the shaft such that the impeller rotates with the rotor;
wherein as the shaft rotates, the rotor and the impeller also rotate, and the plurality of blades generate air flow to create the flow path, such that the air flows around the plurality of blades after cooling the rotor.

6. The apparatus of claim 5, further comprising:
a stator at least partially disposed in the at least one housing portion, the stator surrounding the rotor; and
a gap between the stator and the plurality of blades;
wherein the flow path further comprises the air flowing through the gap after the air flows through the plurality of blades.

7. The apparatus of claim 6, further comprising:
a motor housing, the stator partially disposed in the motor housing; and
a plurality of flow apertures integrally formed as part of the motor housing;
wherein the flow path further comprises the flow of the air through the plurality of flow apertures integrally formed as part of the motor housing after flowing through the air gap.

8. The apparatus of claim 1, the at least one cooling feature further comprising a plurality of fins integrally formed as part of the heat sink.

9. The apparatus of claim 1, the heat sink further comprising:
an inlet port in fluid communication with the flow cavity; and
an outlet port in fluid communication with the flow cavity;

wherein the primary cooling to the heat sink is provided by fluid flowing from the inlet port, circulating through the flow cavity, and flowing through the outlet port, reducing the temperature of the heat sink.

10. A cooling system for a belt starter generator, comprising:
   at least one housing portion;
   a plurality of flow apertures integrally formed as part of the at least one housing portion;
   a heat sink connected to the housing portion, the heat sink cooled by liquid cooling, the heat sink further comprising:
      a flow cavity, the liquid cooling to the heat sink is provided by fluid flowing circulating through the flow cavity;
      a plurality of fins integrally formed as part of the heat sink;
   a rotor at least partially disposed in the housing portion, the rotor having a shaft;
   a plurality of slots integrally formed as part of the rotor;
   an impeller mounted on the shaft, the impeller having a plurality of blades;
   a PCB being part of the belt starter generator, the PCB connected to the heat sink;
   a mainframe connected to the at least one housing portion and the heat sink, such that the heat sink is disposed between the PCB and the mainframe; and
   a flow path;
   wherein as the shaft rotates, the rotor and the impeller also rotate, and the plurality of blades generate air flow to create the flow path such that air flows between each of the plurality of fins, through the plurality of flow apertures, and through the plurality of slots integrally formed as part of the rotor, and through the plurality of blades, achieving air cooling of the belt starter generator.

11. The cooling system for a belt starter generator of claim 10, the at least one housing portion further comprising an end shield, the plurality of flow apertures integrally formed as part of the end shield.

12. The cooling system for a belt starter generator of claim 10, further comprising:
   a stator at least partially disposed in the at least one housing portion, the stator surrounding the rotor; and
   a gap between the stator and the plurality of blades;
   wherein the flow path further comprises the air flowing through the gap after the flow flows through the plurality of blades.

13. The cooling system for a belt starter generator of claim 12, further comprising:
   a motor housing, the stator partially disposed in the motor housing; and
   a plurality of flow apertures integrally formed as part of the motor housing;
   wherein the flow path further comprises the flow of the air through the plurality of flow apertures integrally formed as part of the motor housing after flowing through the air gap.

14. The cooling system for a belt starter generator of claim 10, the heat sink further comprising:
   an inlet port in fluid communication with the flow cavity; and
   an outlet port in fluid communication with the flow cavity;
   wherein the liquid cooling to the heat sink is provided by fluid flowing from the inlet port, circulating through the flow cavity, and flowing through the outlet port, reducing the temperature of the heat sink.

15. The cooling system for a belt starter generator of claim 10, further comprising:
   a clamp mounted to the shaft and adjacent to the rotor; and
   a plurality of flow apertures integrally formed as part of the clamp;
   wherein the clamp is positioned such that each of the plurality of flow apertures integrally formed as part of the clamp is aligned with a corresponding one of the plurality of slots.

* * * * *